US008713352B2

(12) United States Patent
Okada et al.

(10) Patent No.: US 8,713,352 B2
(45) Date of Patent: Apr. 29, 2014

(54) METHOD, SYSTEM AND PROGRAM FOR SECURING REDUNDANCY IN PARALLEL COMPUTING SYSTEM

(75) Inventors: Masakuni Okada, Kanagawa (JP); Fumitomo Ohsawa, Kanagawa-ken (JP); Yoshiko Ishii, Tokyo (JP); Naoki Matsuo, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1399 days.

(21) Appl. No.: 11/608,331

(22) Filed: Dec. 8, 2006

(65) Prior Publication Data

US 2007/0180288 A1    Aug. 2, 2007

(30) Foreign Application Priority Data

Dec. 22, 2005  (JP) .................................. 2005-369863

(51) Int. Cl.
*G06F 11/00*    (2006.01)
(52) U.S. Cl.
USPC ........................................................ 714/4.11
(58) Field of Classification Search
USPC .................................................. 714/4, 44.11
See application file for complete search history.

(56) References Cited

U.S. PATENT DOCUMENTS

| 6,389,451 | B1 * | 5/2002 | Hart ............................... 709/201 |
| 6,718,486 | B1 * | 4/2004 | Roselli et al. .................... 714/41 |
| 8,191,078 | B1 * | 5/2012 | Cullen et al. ................... 719/315 |
| 2004/0225915 | A1 * | 11/2004 | Johnson et al. ................. 714/13 |

FOREIGN PATENT DOCUMENTS

| JP | 01-217642 | 8/1989 |
| JP | 01-217643 | 8/1989 |
| JP | 03-132861 | 6/1991 |
| JP | 03-2353159 | 10/1991 |
| JP | 08287021 | 1/1996 |
| JP | 08185330 | 7/1996 |
| JP | 08-202573 | 8/1996 |
| JP | 2002-024050 | 1/2002 |
| JP | 2002-149203 | 5/2002 |
| JP | 3300776 B | 7/2002 |
| JP | 2005011237 | 1/2005 |

* cited by examiner

*Primary Examiner* — Yair Leibovich
(74) *Attorney, Agent, or Firm* — Grant A. Johnson

(57) ABSTRACT

In a parallel computing system having a plurality of computing node groups including at least one spare computing node group, a plurality of managing nodes for allocating jobs to the computing node groups and an information management server having respective computing node group status information are associated with the computing node groups, and the respective managing nodes update respective in-use computing node group status information by accessing the information management server. Furthermore, when the managing node detects an occurrence of a failure, the managing node having used then the computing node group disabled due to the failure identifies a spare computing node group by accessing the computing node group status information in the information management server. Then, the managing node having used then the disabled computing node group obtains the computing node group information of the identified spare computing node group. Furthermore, since the managing node having used then the disabled computing node group can continue processing by switching the disabled computing node group to the identified spare computing node group as a computing node group to be used, on the basis of the computing node group information of the identified spare computing node group, the redundancy in the parallel computing system can be secured.

17 Claims, 12 Drawing Sheets

SWITCHING USING MANNER B

PARALLEL COMPUTING SYSTEM

SWITCHING USING MANNER B

METHOD, SYSTEM AND PROGRAM FOR SECURING REDUNDANCY IN PARALLEL COMPUTING SYSTEM

FIELD OF THE INVENTION

The present invention relates to a method, a system, and a program product for securing redundancy in order to achieve the improvement in reliability of a parallel computing system which performs parallel processing of a plurality of application programs with a multi-processor system.

BACKGROUND OF THE INVENTION

In recent years, due to the remarkable increase in performance of computer systems and the speeding up of networks, a parallel computing system which performs parallel processing of a plurality of application programs simultaneously has come up and speeding up of the processing is realized in a multi-processor system in which a plurality of computer systems are connected with networks. In such circumstances, there is required a provision of a processing system which can operate with higher reliability and without stopping the processing, even if a failure occurs in a complicated parallel computing system in which a plurality of application programs are distributed to a plurality of computer systems and processed in parallel.

Hence, as the inventions disclosed in Japanese Unexamined Patent Publication (Kokai) No.H1-217642, No.H1-217643, and No.H3-132861, there have come up the invention in which a spare element processor is provided, and when a failure occurs, the processing is continued by switching the element processor to the spare element processor, and the invention which can deal with a failure of a managing node by multiplexing the managing nodes with multiple processors.

Furthermore, as an invention for aiming at the improvement in reliability resulting from the non-stop operation in a multi-processor system, there is the invention entitled "management processing system of a server program" disclosed in Japanese Unexamined Patent Publication (Kokai) No.H3-3351519, but this is the invention in which at least two bi-space management servers, including a currently used bi-space management server and a standby bi-space management server, for managing a currently used server and a standby server, are prepared, and existing information in the currently used bi-space management server is written in a memory, and if the currently used bi-space management server is shut down, the standby bi-space management server serves as the currently used bi-space management server.

In the conventional parallel computing system, however, as shown in FIG. 1, a managing node 100 including a job scheduler 110 for allocating jobs to computing node group and a computing node managing program 120 manages all the computing node groups 130 which perform calculation and processing. As described above, in the prior art in which the managing node and the computing node group are integrated with each other and the function to continue the processing is provided only by switching the processor or the managing node to a spare processor or a spare managing node, there is a case where if a failure occurs in a part of the network, or if a failure occurs in a bigger system unit of other components, such as a trouble of a power supply, a job already queued cannot be handed over to the computing node group capable of processing it, and a part of the processing cannot be continued, so that a whole system is influenced.

SUMMARY OF THE INVENTION

Therefore, it is an object of the present invention to provide a method, a system, and a program product, in which, when a failure occurs in a parallel computing system for performing parallel processing of a plurality of different application programs simultaneously by a multi-processor system, a spare computing node group can continue the processing by succeeding the job already queued, from the computing node group in which the failure has occurred, by switching the computing node group to the spare computing node group.

Moreover, it is another object of the present invention to provide a method, a system, and a program product, in which a computing node group in which a failure is recovered is registered as a new standby spare computing node group, and if a further failure occurs, it functions as a computing node group which can be used by switching.

It is another object of the present invention to provide a method, a system, and a program, in which when a failure occurs in a parallel computing system for performing parallel processing of a plurality of different application programs simultaneously with a multi-processor system, by switching the computing group to a spare computing node group, the spare computing node group can continue the processing by succeeding a job already queued, from a computing node group in which the failure has occurred. Moreover, it is an object of the present invention to provide a method, a system, and a program, in which a computing node group in which the failure has been recovered is registered as a new standby spare computing node group, and if a further failure occurs, it functions as a computing node group which can be used by switching.

In a parallel computing system having a plurality of computing node groups including at least one spare computing node group, a plurality of managing nodes for allocating jobs to the computing node groups and an information management server having respective computing node group status information are associated with the computing node groups, and the respective managing node updates the respective in-use computing node group status information by accessing the information management server.

Also, when the management node detects an occurrence of a failure, the managing node having used then the computing node group disabled due to the failure identifies a spare computing node group by accessing the computing node group status information in the information management server. Then, the managing node having used then the disabled computing node group obtains computing node group information of the identified spare computing node group. Furthermore, the managing node having used then the disabled computing node group can continue processing by switching the disabled computing node group to the identified spare computing node group as a computing node group to be used, on the basis of the computing node group information of the identified spare computing node group. Therefore, the redundancy in the parallel computing system can be secured.

According to aspects of the present invention, it is possible to achieve a parallel computing system capable of continuing processing including already queued jobs by immediately switching the current computing node group to a standby spare computing node group even if a part of the computing node group cannot be used due to a failure in a part of a network or in a power supply as well as a failure in the computing node group itself of a parallel computing system. Moreover, in cases where the computing node group having a failure has recovered from the failure, it is registered as a new spare computing node group so as to handle a new error. Furthermore, a maintenance inspection can be performed by switching to a standby spare computing node group in a scheduled maintenance. Therefore, the scheduled maintenance can be performed without stopping the system from a viewpoint of a user.

DETAILED DESCRIPTION OF THE INVENTION

Figure 1:
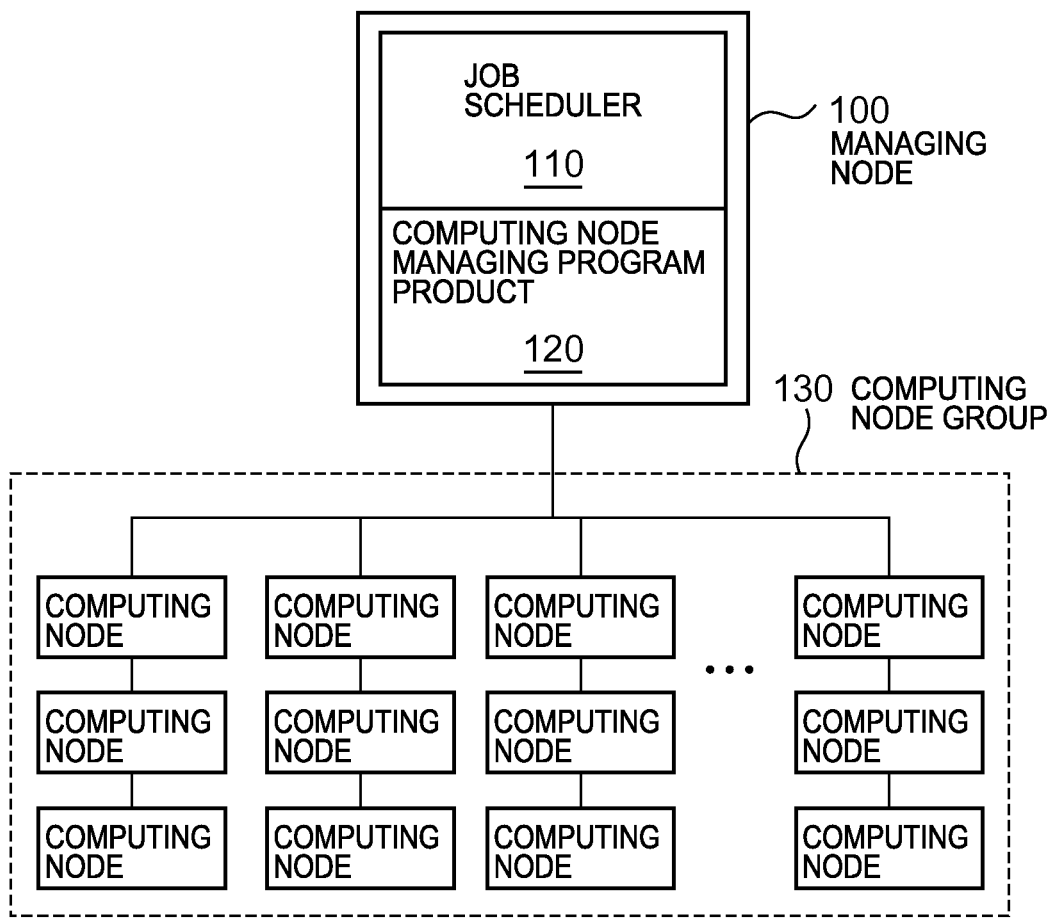
FIG. 1 is a diagram of a parallel computing system (prior art)
Figure 2:
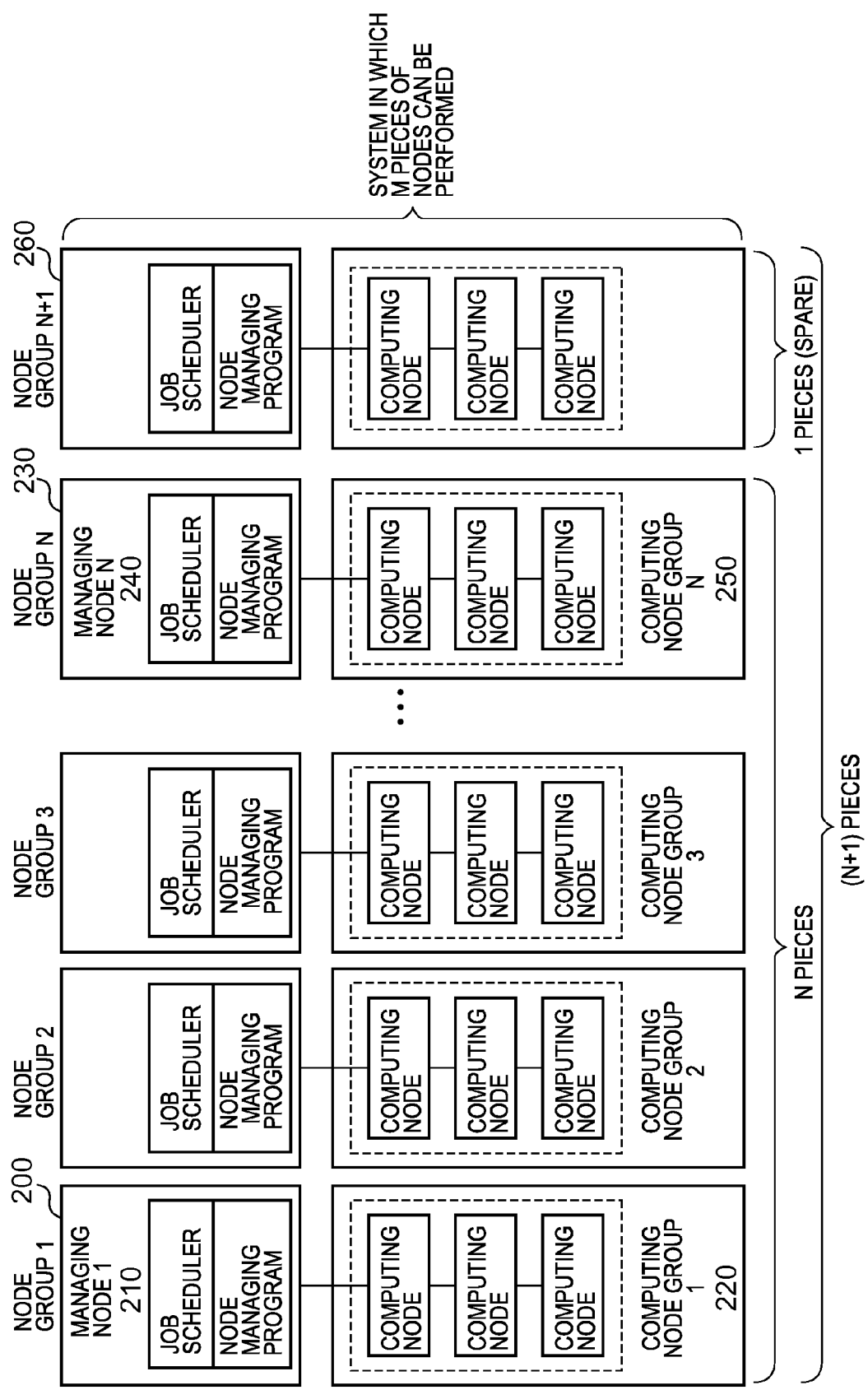
FIG. 2 is a diagram of the configuration of node groups of the present invention.

As shown in FIG. 2, the present invention includes a plurality of managing nodes and a plurality of computing node groups, unlike the prior art shown in FIG. 1, in which one managing node manages all computing node groups. The reason will be described hereinbelow.

According to the present invention, as shown in FIG. 2, each node group 200 is provided with a managing node 210 including a job scheduler for allocating jobs to computing node groups and a node managing program for managing the computing node group, and a computing node group 220. Furthermore, in the case where it is necessary to simultaneously operate N computing node groups for performing M jobs by the computing node groups at the maximum, and supposing that one spare node group is prepared, then the total number of computing node groups will be (N+1) in the whole system. That is, the parallel computing system for achieving the present invention is provided with a plurality of independently managing systems for providing the maximum resources required for performing the jobs, and at least one spare system.

Since the managing node is provided for every computing node group, and respective computing node groups and respective managing nodes are accommodated in separate racks as described above, even if a failure occurs in a certain computing node group, the managing node using the computing node group in which the failure has occurred can continue the processing by switching to the spare computing node group.

Figure 3:
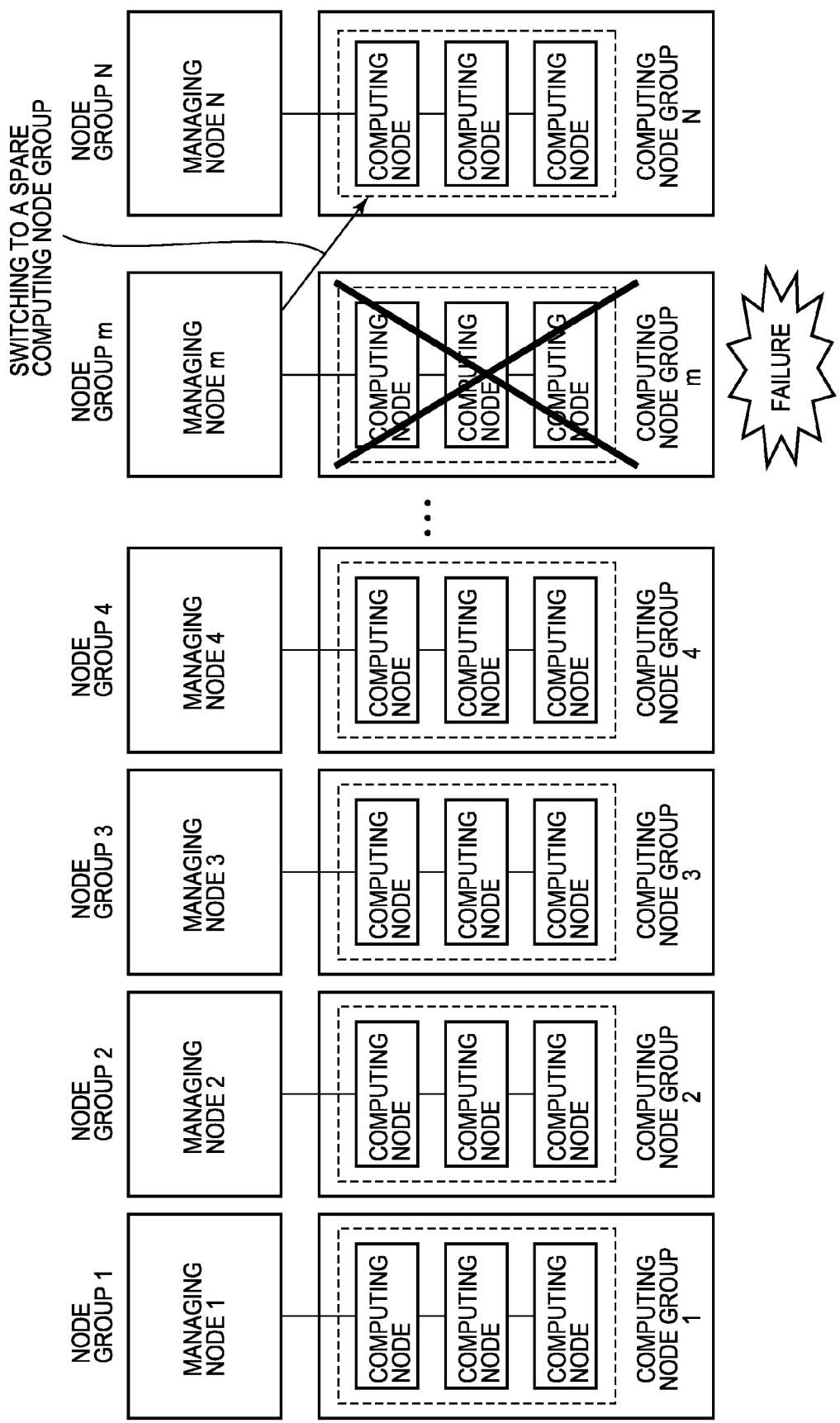
FIG. 3 is a diagram of the configuration of the node groups when a failure occurs.

The above-described feature is plainly explained using the drawings, as follows. In the present invention, as shown in FIG. 3, in the case where a failure occurs in the computing node group m while the managing node m of the node group m performs some processing using the computing node group m, the managing node m can continue the processing by switching the computing node group m to the spare computing node group N. For example, once a failure occurs, the managing node group m checks an error code table that the node managing program has as data, and verifies a failure status, such as Error/Failure/Fatal/Info/Severe/Warning. Subsequently, if the managing node m determines that it is impossible to continue the processing using the computing node group m, it switches the disabled computing node group m to the computing node group N which is the spare computing node group, and continues the processing including the job already queued by the job scheduler.

Incidentally, as an example of the job to be queued, a binary image of an application executed as a task, a parameter list passed to the application, a group name of the node which runs the task, the number of nodes that the application uses, a job priority, or the like may be included.

Figure 4:
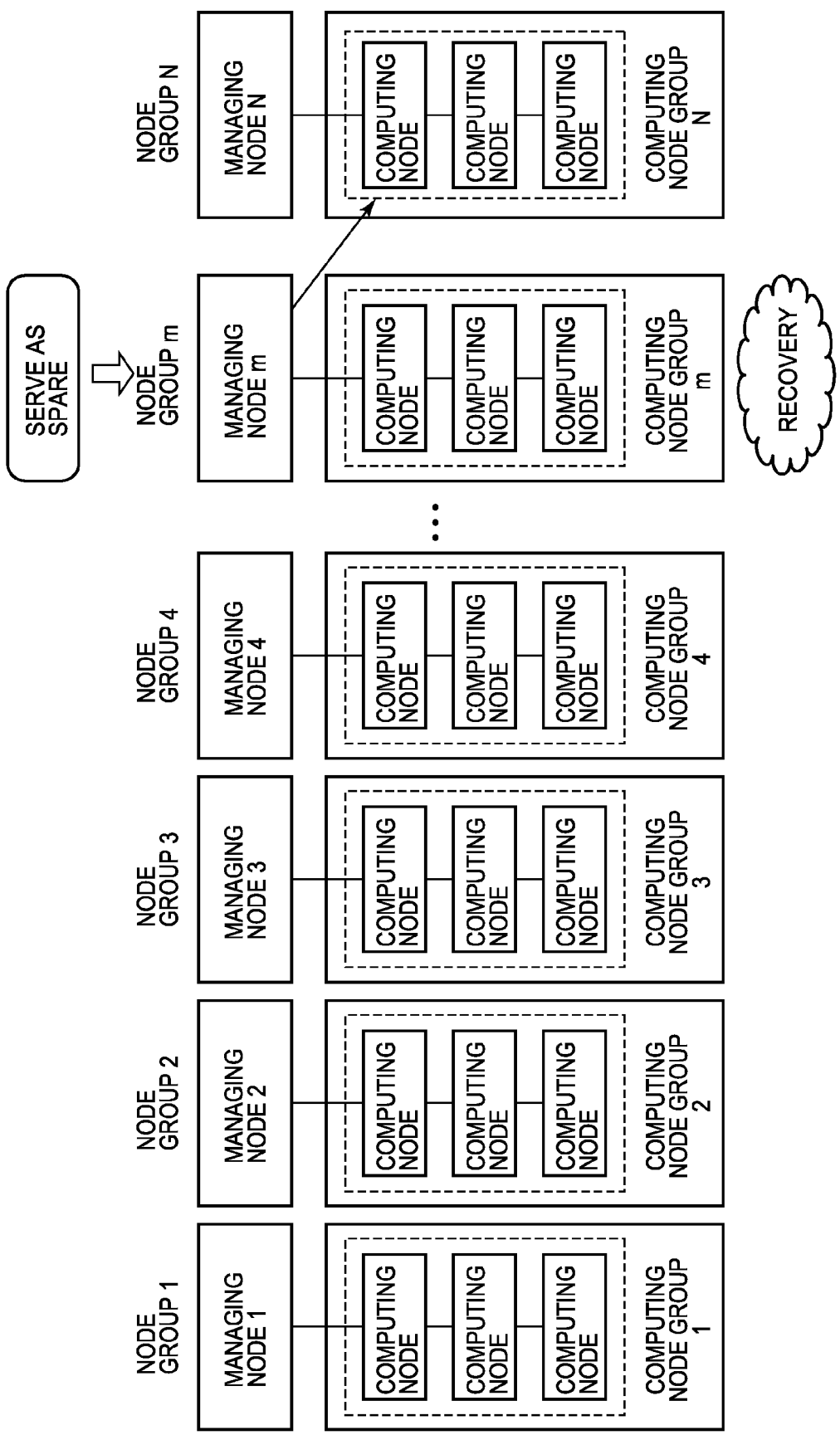
FIG. 4 is a diagram of the configuration of the node groups when the failure is recovered.

Subsequently, as shown in FIG. 4, if the failure of the computing node group m is recovered after continuing the processing by switching to the computing node group N, the computing node group m is registered as a new spare computing node group. Hence, even if a further failure occurs, the managing node having used then the disabled computing node group can continue the processing by switching the disabled computing node group to the computing node group m that has been recovered from the failure and serves as the spare computing node group.

In the prior art, as shown in FIG. 1, since the managing node including the job scheduler is integrated with the computing node group, if failure occurs in a certain computing node group when the job already queued by the job scheduler, the already queued job is not processed. The present invention, however, has a configuration in which a plurality of managing nodes and a plurality of computing node groups are provided, and since a scheme in which information of any computing node group can be accessed from the managing node via the network is provided and the switching to the spare computing node group can be performed by switching a network between the managing nodes and the computing node groups, even if a failure occurs in a certain computing node group, it is possible to continue the processing by switching to the spare computing node group.

Figure 5:
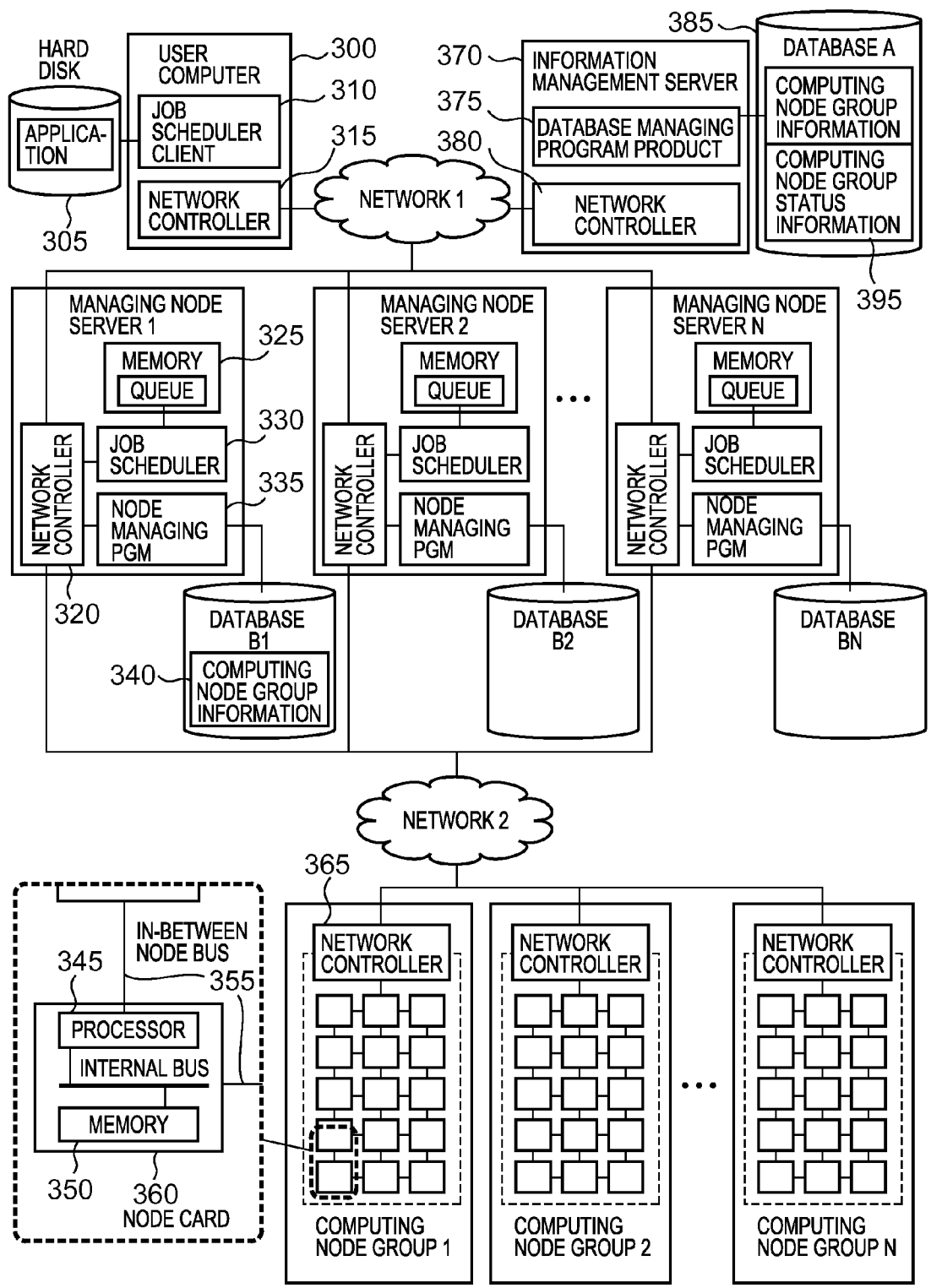
FIG. 5 is a diagram of a hardware and system configuration.

Next, an example of a hardware configuration for achieving the present invention will be described using FIG. 5. The parallel computing system for achieving the present invention has an information management server 370, a user computer 300, and a plurality of managing node servers connected thereto through a network 1 via network controllers 315 and 380, and also has a plurality of computing node groups or the like connected with managing node servers through a network 2 via network controllers 365.

Furthermore, each of computing node groups further includes a plurality of node cards 360, an in-between node bus 355 connects between respective node cards, and each node card 360 has a processor 345 and a memory 350, which are connected with each other with an internal bus. Respective node cards 360 can be then grouped by the dynamic interconnection of the in-between node buses 355, so that the parallel operation processing in which one application program is executed in the unit of the group, using a plurality of processors, can be performed.

Note herein that each processor 345 in the group can execute the program, while performing intercommunication through the in-between node bus 355. Furthermore, the computing node group is connected to the external network 2 via the network controller 365, and can communicate with the managing node servers similarly connected to the network 2 via the network controller.

It will be described in more detail. There are a job scheduler 330 and a node managing program 335 in the managing node server 1, and the node managing program 335 accesses the memory 350, the processor 345, the bus controller, and the like, which are hardware resources on the node card 360, through the network 2 and paths of the in-between node bus 355 and the internal bus, performs grouping of the node cards and loading of the program to the memory on the node card that has been grouped to execute it, obtains RAS information of each component (processor, memory, bus, or the like) in the computing node group, and controls the node group.

Note herein that the RAS information includes a kind of hardware in which a failure occurs, an identifier of the hardware itself in which a failure occurs, a kind of hardware failure (error code), a software in which a failure occurs, an ID of a job in which a failure occurs, a job status (error code), or the like.

Furthermore, since the managing node server and the computing node group communicate with each other via the network, if, for example, a failure occurs in the computing node group that the managing node server 1 uses, the managing node 1 can switch the computing node group that the node managing program 335 controls by switching an address of the computing node group of a communication destination.

Next, the reason why the managing node server 1 can change the address of the computing node group of the communication destination like this is that the node managing program 335 can access computing node group information 340 and 390 and computing node group status information 395, which are pieces of information required for controlling the computing node group. The computing node group information includes identification information of each computing node group, location information of the computing node group, failure information of the computing node group, or the like. Additionally, the computing node group status information includes an ID of the node group, an address of the node group on the network, a status of the node group ("spare", "in-use", "failure") or the like. Hence, the node managing program 335 can switch the computing node group, by accessing the computing node group information 340 and 390 and the computing node group status information 395 for obtaining the above-mentioned information.

Incidentally, in the case where the node group information that the node managing program 335 manages is not present in the local database 340, but present in the other managing node server or the information management server 370, the node managing program 335 can communicate with the other managing node server or the database managing program 375 on the information management server 370 via the network connected through the network controller, and access the required node group information.

Meanwhile, a job execution from the managing node is started by the job scheduler 330 on the managing node. A job entry to the job scheduler 330 is performed by inputting an entry request of an application operating on the computing node group, which is present on the hard disk 305 of the user computer 300, to the job scheduler 330, from the user computer 300 connected through the network 1, using the job scheduler client 310.

The job scheduler 330 to which the job is inputted retrieves hardware resources to which a new job can be inputted via the node managing program product, and if there is any available hardware resource, it request the node managing program to start the new job.

Meanwhile, if there is no hardware resource to which the new job can be inputted, the job request is put on the queue on the memory of the managing node server. The node managing program that has received the request of job execution then groups the node cards in the computing node group by way of the network 2 as described above, and if any available hardware resource is secured, it reads the application to then start the processing.

Also, the node managing program 335 on the managing node server, which has received the RAS information from the computing node group by way of the network 2, communicates with the database managing program 375 on the information management server 370 via the network 1, and refers to and updates the computing node group status information 395 in the database 385 connected to the information management server 370. The computing node status information may include a status of each computing node group ("spare", "in-use", "failure"), an address in the network 2 of the computing node group, and the like.

If a failure occurs in the computing node group, then the node managing program having used the computing node group in which the failure has occurred retrieves a "spare" computing node group by referring to the computing node group status information 395 in the information management server via the network 1 to obtain the address of the spare computing node group, and the node managing program of the managing node switches the reference destination of the node group information and the address of the computing node group to be controlled, and can continue the processing also including the job in the queue, which is managed by the job scheduler, using the normal spare computing node group in standby mode.

At this time, the node managing program changes the computing node group status information of the node group to be newly used from "spare" to "in-use", and also changes the information on the computing node group having the failure to "failure." The status of "failure" is changed to "spare" when the computing node group has been recovered in the normal status by maintenance work.

As described until now, the computing node group information includes identification information of each computing node group, location information of the computing node group, failure information of the computing node group, or the like, whereas the computing node group status information includes information, such as the status of the node group ("spare", "in-use", "failure") or the like.

In addition, there are following three manners of how to manage the computing node group information and the computing node group status information:

Manner A: The information management server manages all the computing node group information and all the computing node group status information ("spare", "in-use", "failure").

Manner B: Each managing node manages the computing node group information of each computing node group, and the information management server manages all the computing node group status information ("spare", "in-use", "failure").

Manner C: Each managing node manages the computing node group information of all the computing node groups, and the information management server manages all the computing node group status information ("spare", "in-use", "failure").

Next, the manners A, B, and C will be described in detail as embodiments 1, 2, and 3, respectively.

Figure 6:
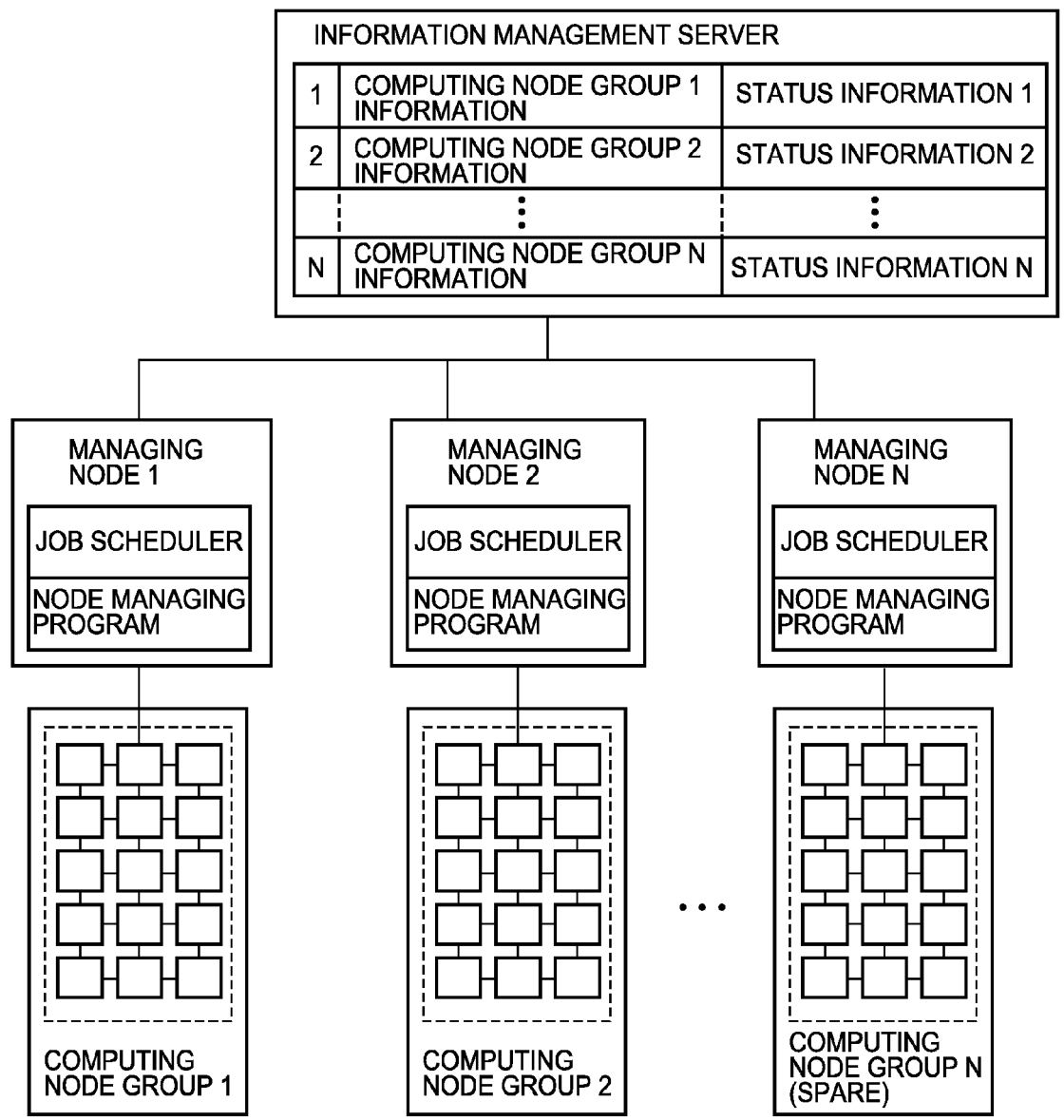
FIG. 6 is a diagram of the system configuration in the manner A.

As shown in FIG. 6, in the manner A, the information management server manages all the computing node group information and all the computing node group status information. In other words, the information management server centrally manages information such that which computing node group is used by each managing node of the parallel computing system, which computing node group has a failure, or which computing node group is in standby mode as the spare computing node group. The node managing program of each managing node then updates the computing node group information of its node, by accessing the information management server via the network.

Figure 7:
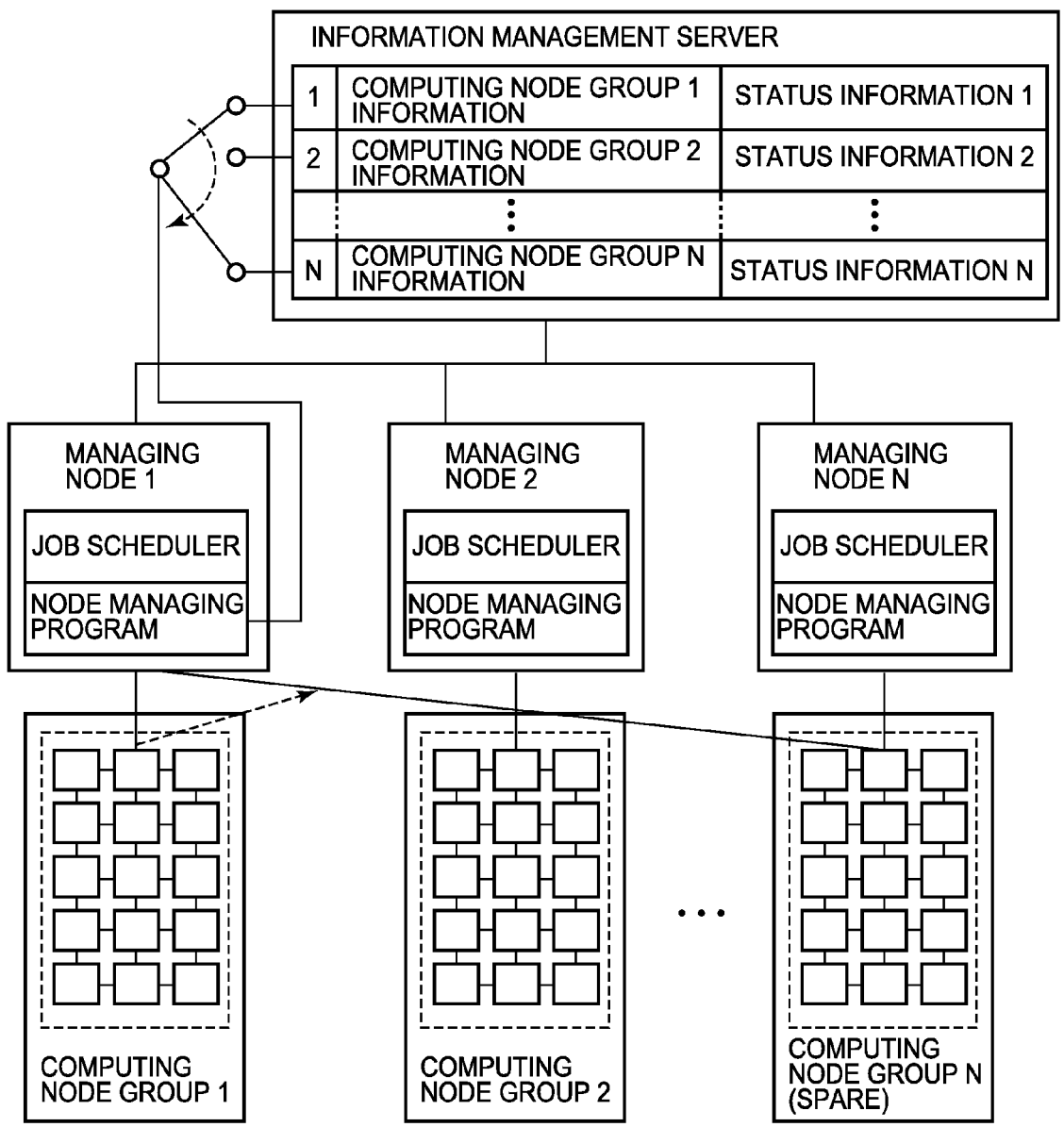
FIG. 7 is a diagram illustrating the computing node group switching in the manner A.

Hence, as shown in FIG. 7, if a failure occurs in the computing node group 1, the node managing program of the managing node 1 obtains the information that the computing node group N is the spare computing node group, by referring to the computing node group status information in the information management server. The computing node group 1 that is used by the managing node 1 is then switched to the computing node group N, on the bases of the computing node group information in the information management server. Since each managing node has the information on the queued job, it is possible to continue the processing also of the job already queued when the failure has occurred, using the new computing node group.

Figure 8:
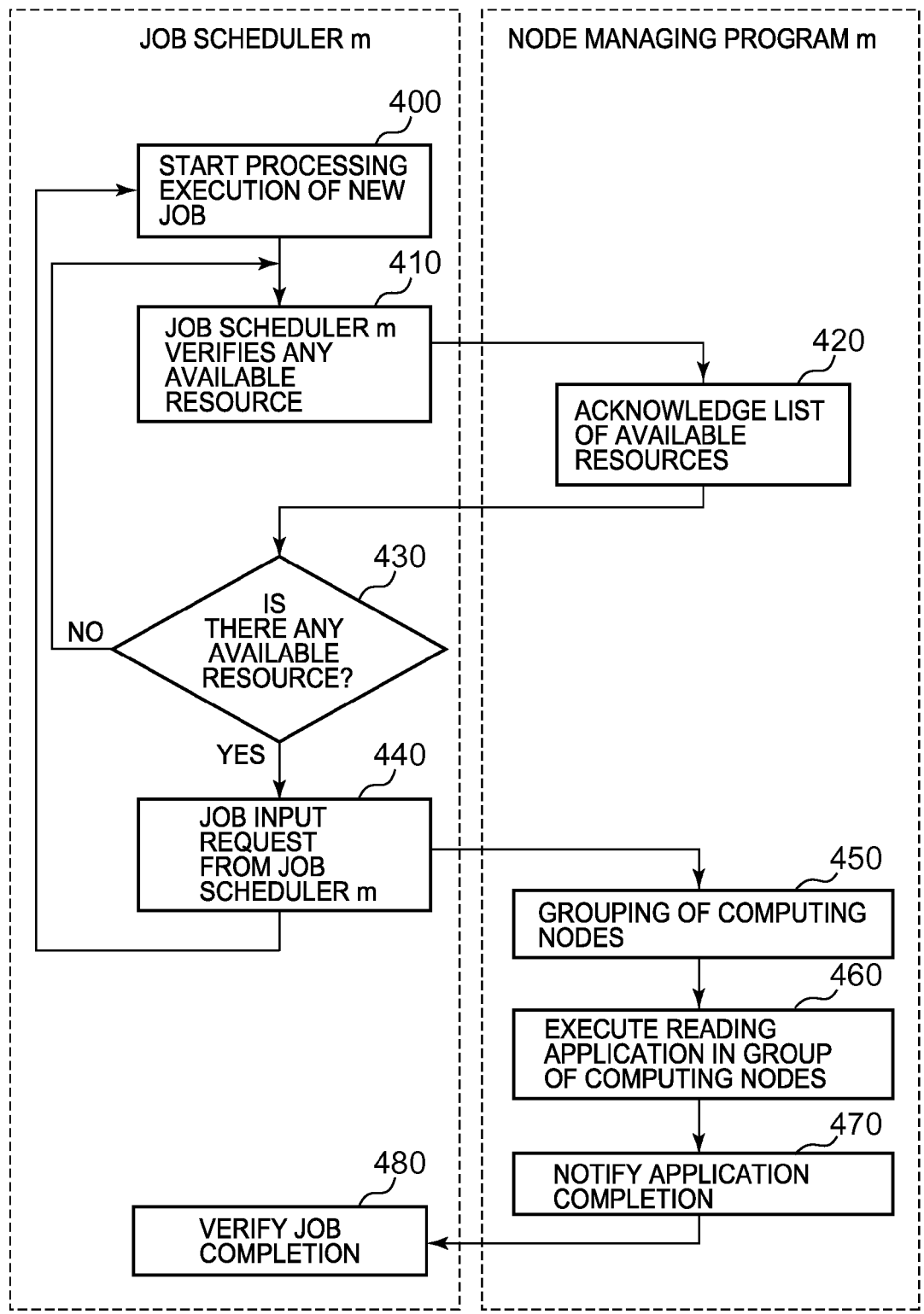
FIG. 8 is a flow chart illustrating the flow in the normal operation.

A process flow in a normal operation before a failure occurs will be then described using FIG. 8. First, when a job is inputted to the job scheduler m from the client program, the job scheduler m starts execution of the job processing (step 400). The job scheduler m then inquires whether or not there is any resource required for the job execution (step 410) to the node managing program m. In response to that, the node managing program m returns the list of available hardwares, and respective statuses thereof (available/not available) (step 420).

Next, the job scheduler m verifies whether or not there is any available resource (step 430), and if there is no available resource required for it, it returns to available resource verification step 410 once again. Meanwhile, if there is any available resource, the job scheduler m requires the node managing program m to input the job (step 440). When the job is inputted, the node managing program m then groups the computing node group in order to perform the job processing (step 450), reads the application into the group of the computing nodes to perform the processing (step 460), and after the application processing is completed (step 470), notifies the job scheduler m of the termination of the job (step 480).

Next, a detailed process flow when a failure occurs in the case of the manner A will be described using FIG. 9. First, when a failure occurs in the computing node group m (step 500), the RAS information is notified to the node managing program m of the managing node m by way of the network which connects between the managing node m and the computing node group m. The node managing program m verifies a passed error code, and if the failure is an unrecoverable failure, it recognizes that the node group m has caused the failure (step 505).

Moreover, for the purpose of detecting a failure occurring in the network for connecting between the managing node m and the computing node group m, or occurring in a mechanism itself for generating the RAS information, the node managing program m of the managing node m periodically inquires for the information on the node group m via the network. Additionally, when there is no acknowledgment to this inquiry, it is also recognized that a failure has occurred in the node group m (step 505).

Note herein that "failure occurrence" information is passed to the job scheduler m (step 510), so that the job entry from the job scheduler to the node group m is stopped (step 545).

Now explaining a certain parallel computing system as an example, the "failure occurrence" information is a job ID, status information of the job, and the like in the above-described RAS information. The job scheduler which has recognized the failure tries to perform re-entry of the job, and in this case, the job scheduler first inquires whether or not there is any available hardware resource to the node managing program, before inputting the job from the job scheduler to the node group.

As a result of the inquiry, the list of hardware resources available in the node groups, and respective status information ("failure", "spare", "in-use") are returned. At the time of an occurrence of a failure, the node managing program recognizes the occurrence of the failure according to the RAS information, and it is transmitted to the job scheduler that the hardware resource is in "failure." Hence, the job scheduler notified that any hardware resource of the node group is not available stops the job input request (step 545). Thereafter, the job scheduler periodically inquires whether or not there is any available resource to the node managing program.

Figure 9:
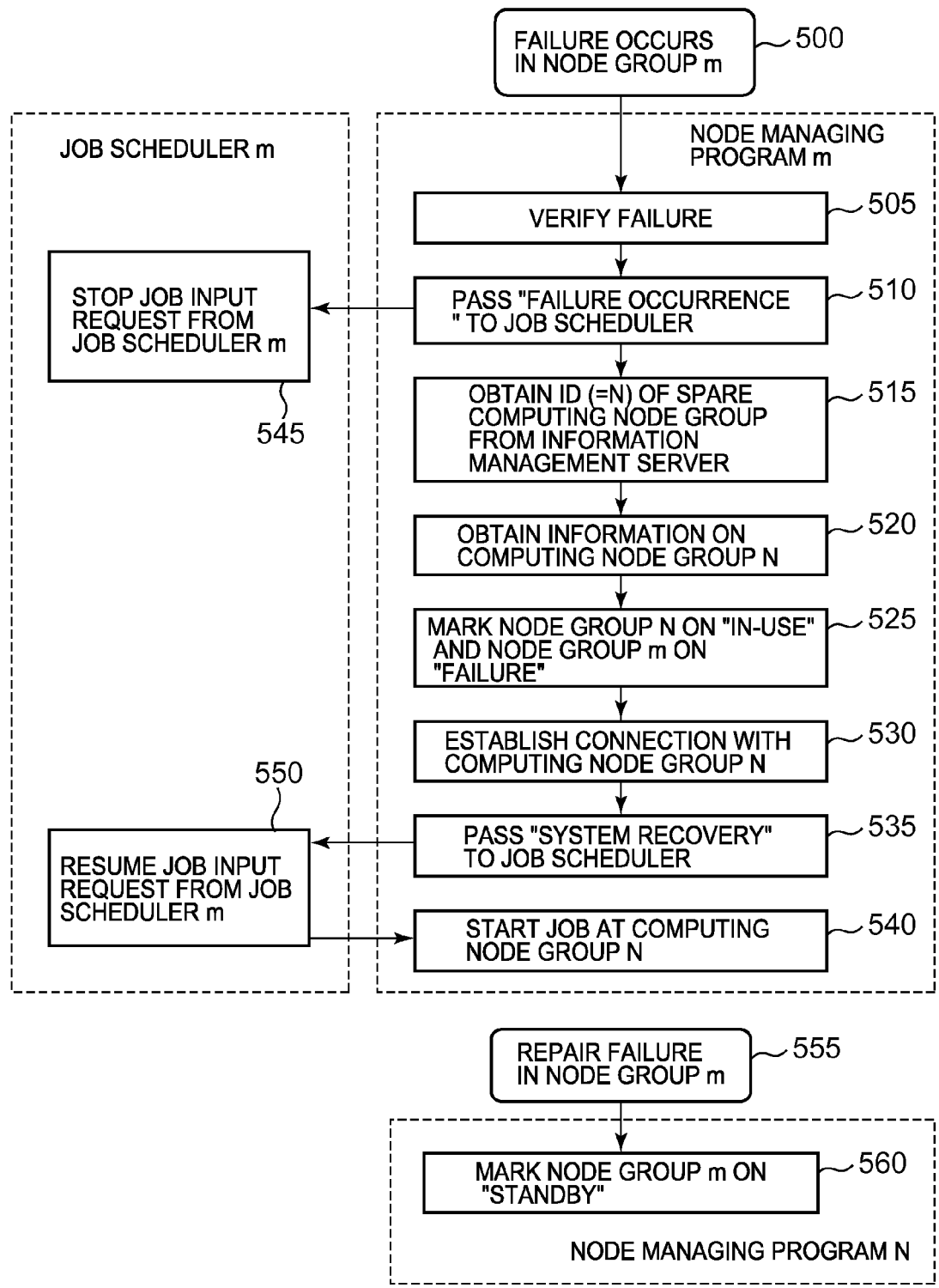
FIG. 9 is a flow chart illustrating the flow from a failure occurrence to a failure recovery.

Next, as shown at step 515 in FIG. 9, the node managing program m retrieves for a node group whose computing node group status information on the information management server is "spare", and obtains information that the computing node N is the spare computing node group, from the information management server (step 515). The node managing program m then obtains the computing node group information of the computing node group N (step 520), and switches the reference destination of the computing node group information from the computing node group m to the computing node group N.

The status of the newly used node group N is changed from "spare" to "in-use", and the status of the node group m which used to be "in-use" is changed to "failure" (step 525), so that the node managing program m establishes the connection with the computing node group N (step 530). The connection switch is performed by changing the connection destination from the managing node m to the network address of the computing node group N obtained from the computing node group status information of the information management server.

When the managing node establishes the connection with the computing node group N which is the spare computing node group, "system recovery" information is notified to the job scheduler by returning the list including available hardware resources, from the node managing program to the job scheduler which periodically inquiries for an available resource (step 535), and the job input from the job scheduler is resumed to thereby start the job processing in the computing node group N (step 540).

Note herein that once the failure of the computing node group m is repaired (step 555), the status of the computing node group m is changed from "failure" to "spare", and the computing node group m is registered as a new spare computing node group (step 560).

Incidentally, for the other manners B and C, although there is a difference in where the computing node group information is present, basic process flows thereof are the same as that of the manner A described above.

Figure 10:
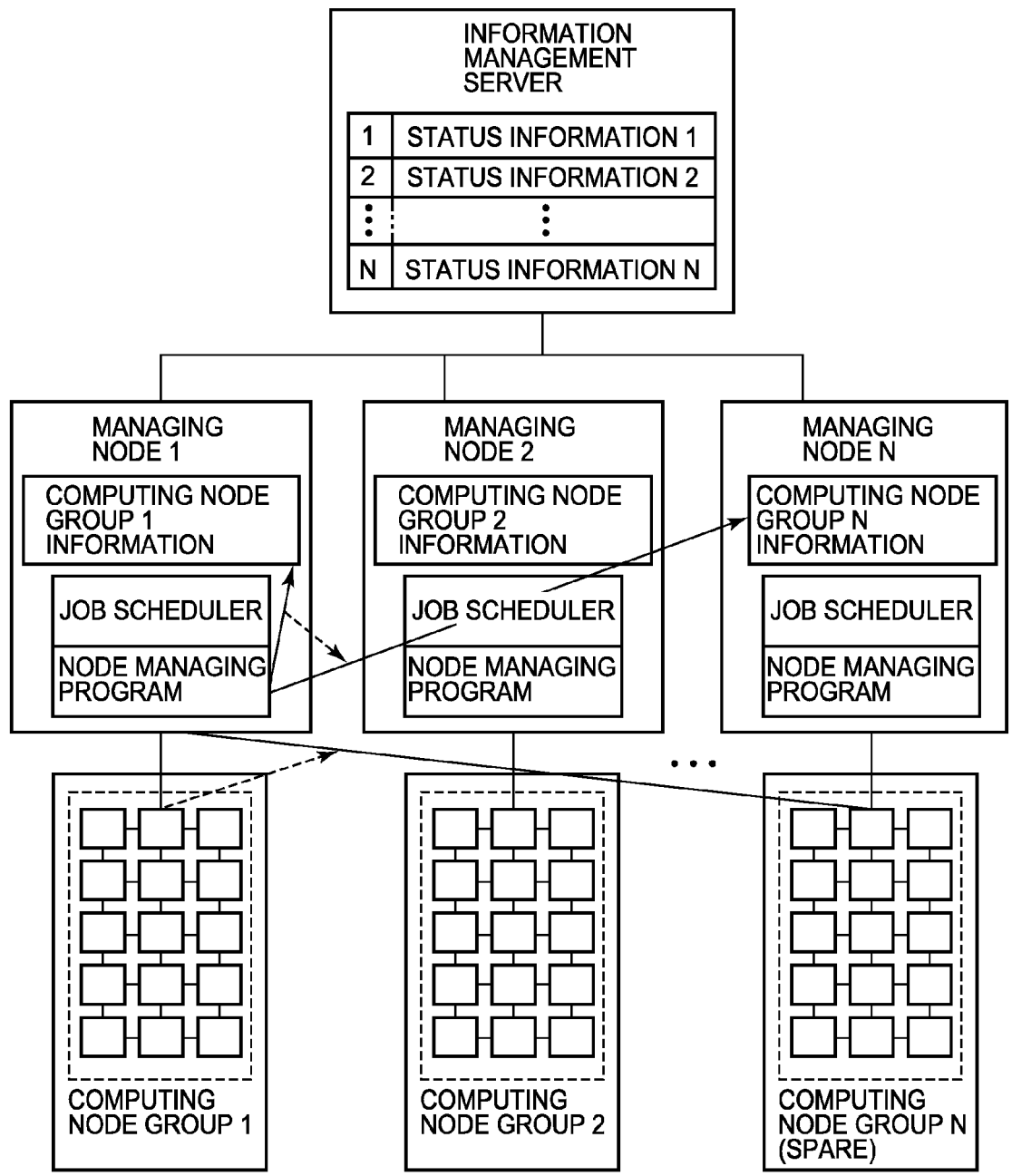
FIG. 10 is a diagram illustrating the computing node group switching in the manner B.

Next, the manner B shown in FIG. 10 will be described. In the manner B, each managing node manages the computing node group information of each computing node group, and the information management server manages all the computing node group status information. Accordingly, unlike the manner A, when the in-use computing node group is the computing node group in the same node, each node managing program in the manner B can update the computing node group information, by locally accessing the computing node group information in the same managing node. Meanwhile, when the in-use computing node group is the computing node group in a node different from the managing node, the node managing program updates the computing node group information, by accessing the managing node having corresponding node group information via the network. Moreover, only when the computing node group status information changes, the node managing program updates the computing node group status information, such as "in-use", "spare", and "failure" by accessing the information management server.

As a result, when a failure occurs in the computing node group 1, the node managing program in the managing node 1 recognizes that the computing node group N is standing by as a spare, by referring to the computing node group status information in the information management server. Subsequently, the node managing program in the managing node 1 continues the processing by switching the computing node group 1 to the spare computing node group N as a computing node group to be used.

Next, the manner C shown in FIG. 11 will be described. In the manner C, each managing node manages the computing node group information of all the computing node groups, and the information management server manages all the computing node group status information ("spare", "in-use", "failure")

Accordingly, in the manner C, for example, the information on the computing node group 1 of the computing node group 1 which is used by the managing node 1, and the information on the computing node group N which is the spare computing node group are both in the local managing node, namely, in the managing node 1.

Figure 11:
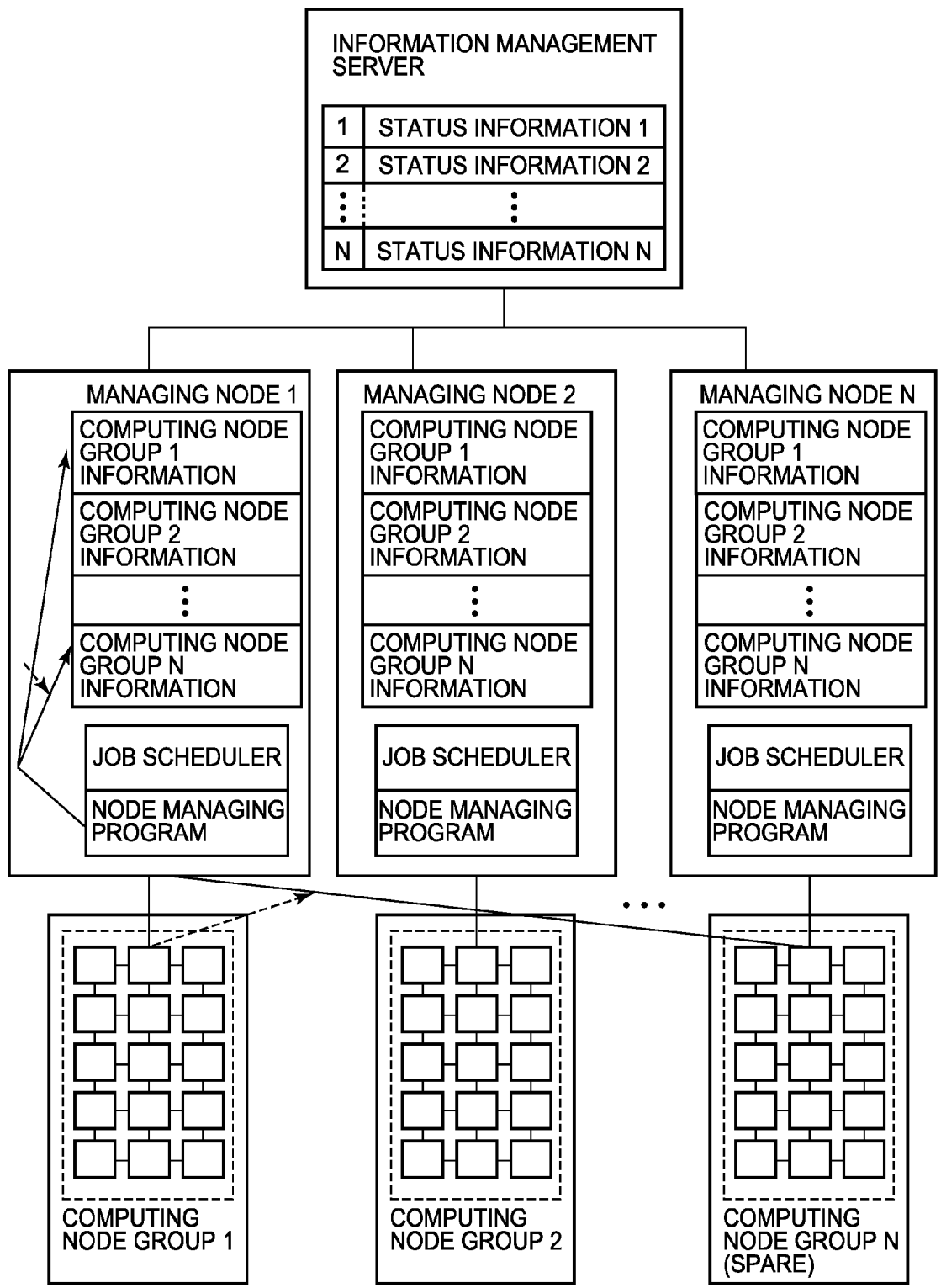
FIG. 11 is a diagram illustrating the computing node group switching in the manner C.

Hence, as shown in FIG. 11, in the manner C, when a failure occurs in the computing node group 1, the node managing program in the managing node 1 identifies that the computing node group N is standing by as a spare, by referring to the computing node group status information in the information management server, and by referring to the information on the computing node group N in the same managing node 1 can continue the processing by switching the computing node group 1 to the spare computing node group N as the computing node group to be used.

Additionally, the update of the computing node group information to be used does not need to access the information management server via the network, and what is necessary is just to update the computing node group information in the same managing node as the node managing program.

Note herein that the information of the spare computing node group may be the same at each managing node, and the information on the node group other than that may not be maintained so as to have the same value. As a result, the node managing program in each managing node may update the computing node group information, which is present in its own managing node, and is being used by itself.

When the computing node group status information changes, the computing node control program then updates the computing node group status information, such as "in-use", "spare", and "failure" by accessing the information management server.

Incidentally, while a case where the standby spare computing node group is one has been described in the above description, it is also possible to constitute so as to have a plurality of spare computing node groups.

Figure 12:
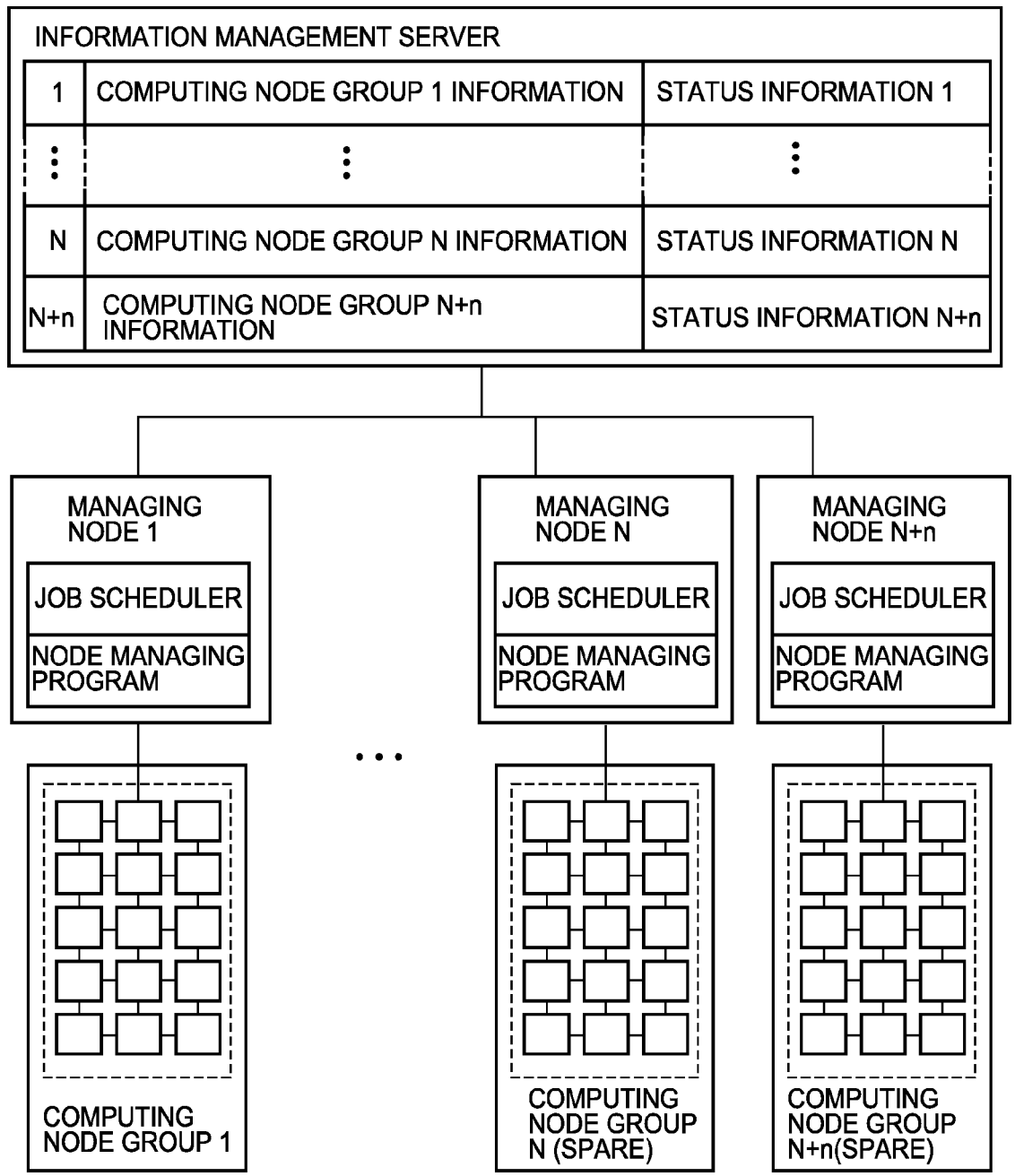
FIG. 12 is a diagram of the system configuration when a plurality of standby spare computing node groups are provided.

When a plurality of standby spare computing node groups are provided, there are a plurality of computing node groups whose computing node group status information is "spare", such as computing node groups N and N+n as shown in FIG. 12. The node managing program of the node in which the failure has occurred then retrieves computing node groups to be switched, and just switches to a spare computing node group that is found first, so that how to switch is the same as the case where the spare computing node group is one as described until now.

If there are a plurality of standby spare computing node groups, even when one spare computing node group is used due to a failure occurrence in a certain computing node group, and a further failure occurs in another computing node group while the computing node group having the failure is not repaired yet, the processing can be continued by switching the computing node group to another spare node group, so that a further reliable system can be constructed without stopping the system.

Moreover, the node managing program operating in the managing node is multiplexed. Or, if there is provided a plurality of instances of the node groups managed by one managing node program, one node can manage a plurality of computing node groups, so that it is also possible to have a configuration in which the computing node groups are larger than the managing nodes in number.

Incidentally, various embodiments of the present invention can be achieved with various hardware and software configurations. In addition, the program for achieving the present invention may be stored in external storage media. Incidentally, as the external storage media, optical recording media such as DVDs, a magneto-optical recording media, such as MOs, tape media, semiconductor memory media such as IC cards, or the like may be used other than CD-ROMs and flexible disks. Meanwhile, storage devices such as hard disk and RAMs in the server system connected to the Internet or a private telecommunication network may be used as the record media to thereby provide the program to the computer via the network.

The invention claimed is:

1. A method for securing redundancy in a parallel computing system having a plurality of computing node groups including at least one spare computing node group, the method comprising:

associating a plurality of managing nodes with one of a plurality of computing node groups having respective node group information, and with an information management server having respective computing node group status information for the plurality of computing node groups; wherein the system is configurable using three manners of computing node group switching;

receiving a job at a first of the plurality of managing nodes;

queuing the job for processing on the computing node group associated with the first of the plurality of managing nodes;

updating, by the first of the plurality of managing nodes, the in-use status information for the associated computing group node by accessing the information management server;

detecting, by the first of the plurality of managing nodes, an occurrence of a failure in the associated computing node group;

identifying, by the information management server in a first manner, by the first of the plurality of managing nodes in a second manner, or by all managing nodes in a third manner, a spare computing node group by accessing the computing node group status information in the information management server;

obtaining, by the information management server in the first manner, by the first of the plurality of managing nodes in the second manner, or by all managing nodes in the third manner, computing node group information of the identified spare computing node group;

disabling the computing group node associated with the detected failure; reassociating the first of the plurality of managing nodes with the identified spare computing node group;

continuing, by the first of the plurality managing nodes, processing of the queued job using the identified spare computing node group;

when the failure of the disabled computing node group is recovered, switching the disabled computing node group to the identified spare computing node; and registering the disabled computing node to the information management server as a new identified spare computing node group.

2. The method according to claim 1, wherein the computing node group information includes a network address for each of the associated computing node groups; and wherein the reassociating comprises changing a network address from the disabled computing node group to the identified spare computing node group.

3. The method according to claim 2, wherein the computing node group status information for all of the plurality of computing node groups is collectively managed by the information management server.

4. The method according to claim 3, wherein the total number of computing node groups is provided by adding the number of spare computing node groups required for the jobs to be operated simultaneously to the number of the at least one computing node groups.

5. The method according to claim 4, wherein the computing node group information includes identification information of the computing node group, location information of the computing node group, failure information of the computing node group, and the computing node group status information includes information for indicating a status of the computing node group.

6. The method according to claim 5, wherein the respective computing node group status information and the respective computing node group information of the computing node groups are collectively managed by the information management server.

7. The method according to claim 5, wherein respective computing node group status information are collectively managed by the information management server, and the respective computing node group information of the computing node groups are managed by the respective managing nodes, when in the second configuration manner.

8. The method according to claim 5, wherein the respective computing node group status information are collectively managed by the information management server, and the respective managing nodes manage the computing node group information of the respective computing node groups, and the computing node group information of the spare computing node group, when in the second configuration manner.

9. A parallel computing system having a plurality of computing node groups having respective node group information, including at least one spare computing node group for securing redundancy, comprising:

an information management server having a plurality of managing nodes for allocating jobs to their associated computing node groups, and having respective computing node group status information; wherein the system is configurable using three manners of computing node group switching; and the information management server in a first manner, the first of the plurality of managing nodes in a second manner, or all managing nodes in a third manner are configured to:

update the respective in-use computing node group status information by accessing the information management server;

receive a job;

queuing the job for processing on the associated computing node group;

detect an occurrence of a failure in the associated computing node group and in response:

identify a spare computing node group by accessing the computing node group status information in the information management server;

obtain computing node group information of the spare computing node group; and continue processing of the queued job by switching the disabled computing node group to the spare computing node group on the basis of the computing node group information of the spare computing node group;

detect a recovery of the disabled computing node group and in response:

register the disabled computing node to the information management server as a new spare computing node group.

10. A program product for securing redundancy in a parallel computing system having a plurality of computing node groups having respective node group information, including at least one spare computing node group, the program product comprising a computer readable storage media bearing instructions for securing the redundancy in the parallel computing system by causing the parallel computing system to execute the acts of:

associating a plurality of managing nodes with one of a plurality of computing node groups and with an information management server having respective computing node group status information for the plurality of computing node groups;

receiving a job at a first of the plurality of managing nodes;

queuing the job for processing on the computing node group associated with the first of the plurality of managing nodes;

updating, by the first of the plurality of managing nodes, the in-use status information for the associated computing group node by accessing the information management server;

detecting, by the first of the plurality of managing nodes, an occurrence of a failure in the associated computing node group;

identifying, by the information management server in a first manner, the first of the plurality of managing nodes in a second manner, or all managing nodes in a third manner, a spare computing node group by accessing the computing node group status information in the information management server;

obtaining, by the information management server in a first manner, the first of the plurality of managing nodes in a second manner, or all managing nodes in a third manner, computing node group information of the identified spare computing node group;

disabling the computing group node associated with the detected failure; reassociating the first of the plurality of managing nodes with the identified spare computing node group;

continuing, by the first of the plurality managing nodes, processing of the queued lob using the identified spare computing node group;

when the failure of the disabled computing node group is recovered, switching the disabled computing node group to the identified spare computing node, and registering the disabled computing node to the information management server as a new identified spare computing node group.

11. The program product according to claim 10, wherein the computing node group information includes a network address for each of the associated computing node groups; and wherein the reassociating comprises changing a network address from the disabled computing node group to the identified spare computing node group.

12. The program product according to claim 11, wherein the computing node group status information for all of the plurality of computing node groups is collectively managed by the information management server.

13. The program product according to claim 12, wherein the total number of computing node groups is provided by adding the number of spare computing node groups required for the jobs to be operated simultaneously to the number of the at least one computing node groups.

14. The program product according to claim 13, wherein the computing node group information includes identification information of the computing node group, location information of the computing node group, failure information of the computing node group, and the computing node group status information includes information for indicating a status of the computing node group.

15. The program product according to claim 14, wherein the respective computing node group status information and the respective computing node group information of the computing node groups are collectively managed by the information management server, when in the first configuration manner.

16. The program product according to claim 14, wherein respective computing node group status information are collectively managed by the information management server, and the respective computing node group information of the computing node groups are managed by the respective managing nodes, when in the second configuration manner.

17. The program product according to claim 14, wherein the respective computing node group status information are collectively managed by the information management server, and the respective managing nodes manage the computing node group information of the respective computing node groups, and the computing node group information of the spare computing node group, when in the second configuration manner.

* * * * *